United States Patent

Anderson

[15] 3,676,637
[45] July 11, 1972

[54] APERTURE COVER AND METHOD OF MAKING THE SAME

[72] Inventor: David G. Anderson, Bloomfield Hills, Mich.

[73] Assignee: Quanta Welding Company, Troy, Mich.

[22] Filed: Oct. 15, 1970

[21] Appl. No.: 80,921

[52] U.S. Cl. .............................219/117 R, 219/86, 219/91, 219/107
[51] Int. Cl. .......................................................B23k 11/04
[58] Field of Search ....................219/117 R, 91, 85, 86, 119

[56] References Cited

UNITED STATES PATENTS

| 3,435,181 | 3/1969 | Walkow | 219/91 |
| 2,287,540 | 6/1942 | Vang | 219/117 X |
| 3,067,320 | 12/1962 | Muir | 219/91 X |
| 3,113,202 | 12/1963 | Molen et al. | 219/117 R |
| R15,466 | 10/1922 | Murray, Jr. | 219/117 R |

Primary Examiner—J. V. Truhe
Assistant Examiner—Gale R. Peterson
Attorney—Wilson & Fraser

[57] ABSTRACT

The method of producing the aperture cover wherein the parts being integrated are disposed in juxtaposed position followed by a time phased application of a force pulse and an electrical energy pulse to the assembled parts to produce a solid state resistance weld at the faying interface.

7 Claims, 6 Drawing Figures

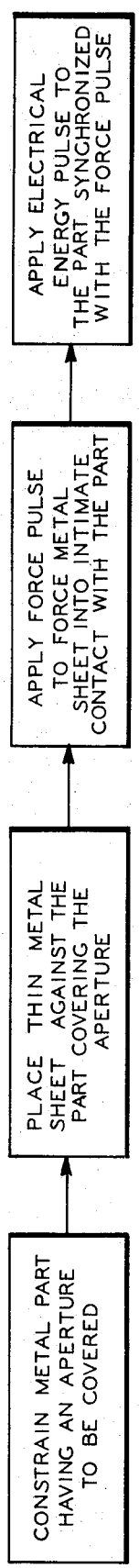
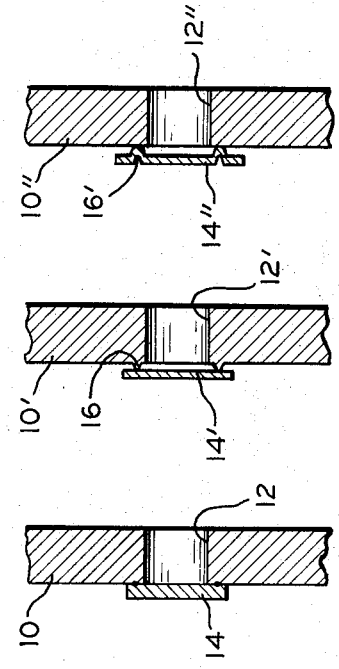
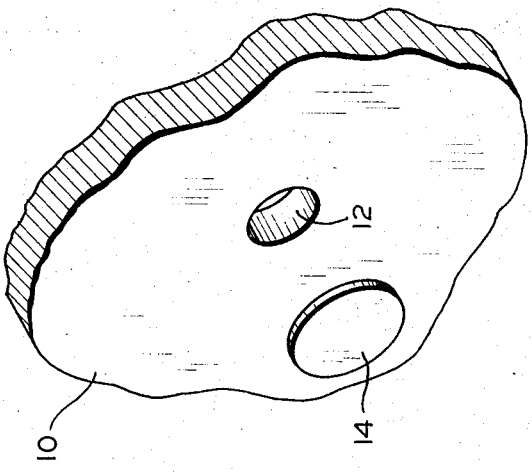
INVENTOR.
DAVID G. ANDERSON

INVENTOR.
DAVID G. ANDERSON

BY
Wilson & Fraser
ATTORNEYS

APERTURE COVER AND METHOD OF MAKING THE SAME

BACKGROUND OF THE INVENTION

In the manufacturing process for producing engine blocks for use in internal combustion engines, the internal passageways for the conduction of lubricating fluids through the completed engine may be formed by drilling. The drilled passageways traverse the entire length of the block and may intersect with other cavities or drilled holes to conduct the lubricating fluid. The drilled passageways that traverse the entire length of the engine block are known as "galley holes." Since the lubricating fluids would escape through the galley holes during engine operation, the holes must be adequately sealed. Two principal methods are utilized for sealing the galley holes. One of the methods involves the use of a relatively soft metal plug which is merely forced into tight engagement in the holes by means of means of a hammer or the like instrument. The other method involves tapping and threading the holes for the receipt of a threaded plug. It has been found that after operation of the engine has occurred, seepage of the lubricating fluid has taken place around the prior art galley hole plugs, necessitating repair and replacement thereof.

SUMMARY

It is a feature of the invention to produce a fluid-tight cover for apertures in relatively massive parts and a method of making the same.

The aperture cover of the invention is fabricated by employing a solid-state resistance weld interconnecting a thin walled disc of sheet metal to the peripheral marginal portion of the exposed face of a massive structure such as an internal combustion engine casting having a galley hole in the exposed surface thereof.

BRIEF DESCRIPTION OF THE DRAWINGS

The objects and advantages of the invention will become readily apparent to those skilled in the art from reading the following detailed description of certain embodiments of the invention when considered in the light of the accompanying drawings, in which:

FIG. 1 is a flow diagram of the method of the invention as applied to the fabrication of a sealing covering for galley holes formed in the cast blocks of internal combustion engines;

FIG. 3 is a fragmentary exploded perspective view of the metal cover member and the part containing the aperture to be covered;

FIG. 4 is a fragmentary sectional view of the assembled composite structure of the invention illustrated in FIGS. 2 and 3;

FIG. 5 is a fragmentary sectional view of an assembled composite structure showing a modified form of the invention; and FIG. 6 is a fragmentary sectional view of an assembled composite structure showing another modified form of the invention.

DESCRIPTION OF THE PREFERRED EMBODIMENT

Figure 2:
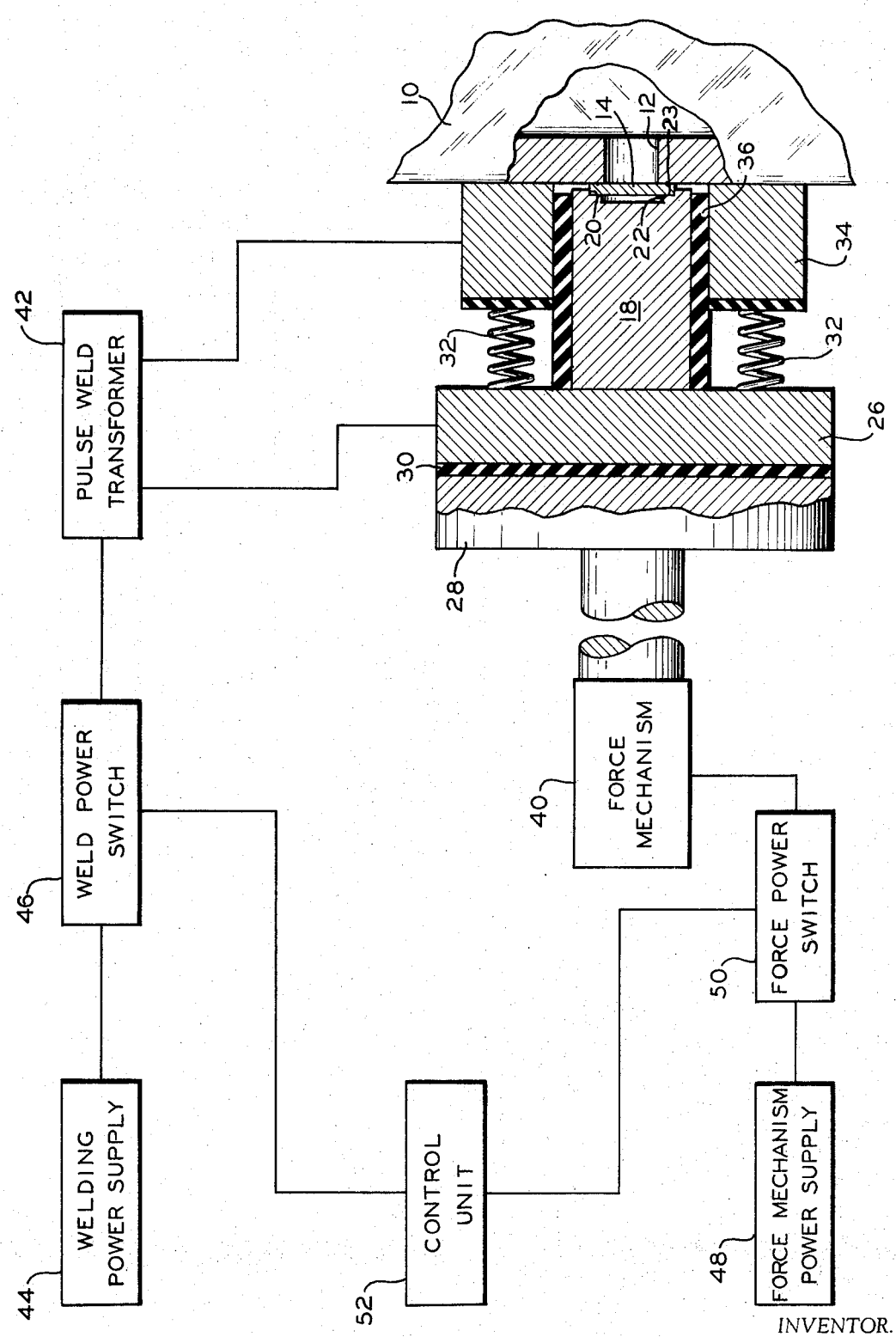
FIG. 2 is a schematic diagram of one form of apparatus and associated system for carrying out the method illustrated in FIG. 1.

As diagrammatically illustrated in FIG. 1, the invention relates to a composite structure of a relatively massive metal part having an aperture to be covered and a thin metal sheet covering the aperture and welded thereto, and the method of making the same utilizing a solid-state resistance welding technique of the thin metal sheet to the peripheral marginal portions of the aperture of the relatively massive part. The method involves the time phased application of a force pulse and a pulse of electrical energy of a current density within the range of from 500,000 to 3,000,000 amperes per square inch of weld or bond interface, typically for an interval of time of the order of 0.5 to 5.5 milli-seconds to effectively weld the parts together to form an integral unitary article.

In order to properly and adequately explain the method illustrated in FIG. 1, reference will be made to the fabrication of a galley hole cover for an internal combustion engine block, as illustrated in FIGS. 2 through 6, inclusive. The engine block, only a portion of which is illustrated in the drawings, is generally indicated by reference numeral 10. The engine block 10 is typically formed of an iron casting and contains at least one galley hole 12. The galley hole 12 is utilized during the production of the engine block 10 to provide a passageway through which lubricating fluids may be conducted during operation of the assembled engine. Since, in the operation of the completed engine, the lubricating fluid is pumped through the interior passageways of the engine, the external portion of the galley hole 12 must be covered. Prior attempts at plugging the galley holes by a relatively softer metal, and by the use of a threaded plug, have not been completely successful, since the plugs have allowed a seepage of lubrication therethrough during operation. In order to completely seal the galley hole 12, a thin walled metal sheet disc 14 is utilized and welded to the exterior of the engine block 10 in proper overlying relation to the galley hole 12. It will be appreciated that the welding of the disc 14 to the exterior wall of the engine block 10, by normal welding techniques, would be extremely difficult to achieve. The welding procedure of the invention is illustrated in particular detail in FIG. 2. In the procedure illustrated in FIG. 2, the relatively massive engine block 10 is initially suitably constrained against any lateral movement thereof. Next, the disc 14, which is typically formed of a sheet of electrically conductive metal of the order of 0.060 in thickness, to be bonded to the exterior surface of the block 10, is positioned on the lower terminus of a center electrode element 18. Typically, the electrode element 18 includes a cavity 20 for receiving the disc 14 which effectively constrains the disc 14 from any lateral movement during the welding process.

The electrode element 18 also includes an inwardly projecting cavity 22 which is of a smaller diameter than the diameter of the cavity 20 and is provided to produce a land 23 which is in contact with the outer marginal edge portion of the inner surface of the disc 14 when the disc 14 is placed within the cavity 20.

An adjacent platen member 26 formed of an electrically conductive metal is attached to a force mechanism 40, to be described in greater detail hereinafter, through a support 28 which is insulated therefrom by an insulating layer 30. It will be appreciated that there is an electrically conductive path provided between the electrode element 18 and the platen member 26. In certain instances, it may be desirable to fabricate the electrode element 18 and the adjacent platen member 26 in the form of an integral unit.

In operation, the platen member 26 is initially moved toward the engine block 10, typically by maintaining the engine block 10 in a fixed position and moving the platen 26 laterally until the disc 14 is in contact with the exterior surface of the block 10 in such a fashion that the disc 14 overlaps and covers the hole 12. It will be appreciated that, simultaneously with the closing movement of the adjacent platen member 26 relative to the engine block 10, a series of spaced apart helical springs 32 are caused to be compressed. The lower ends of the springs 32 function to exert a downward pressure on an outward ring-type electrode element 34 formed to coaxially surround in spaced relation the center electrode 18. The center electrode element 18 and the outer electrode element 34 are electrically insulated from one another by a sleeve 36 formed of an electrically insulating material such as Teflon, for example, which not only provides for electrical insulation, but also provides a bearing surface between the electrodes to facilitate relative movement therebetween.

The force mechanism 40, which includes a pressure transducer, is provided to apply a pressure pulse on the platen 26, which is, in effect, superimposed on the initial forces applied by the closing of the platen 26 adjacent to the block 10. The specific mechanism employed for developing the force by the force mechanism 40 may be of the type illustrated and described in the patent to A. G. Vang, U.S. Pat. No.

3,059,094, of Oct. 16, 1962. As will become readily apparent hereinafter, when the electrical energy is pulsed through the electrode elements 18 and 34, a pressure pulse is imposed by the pressure transducer of the force mechanism 40.

It has been found in practice that forces developed of from the order of 2,000 to 3,000 pounds have been employed to produce satisfactory solid state welds with the described process. These pressures are not considered to be critical and may be varied over a rather large range. The pressure imposed on the system can be imposed in many different wave forms, one of which is sinusoidal. As a general rule, the force pulse is applied before the application of the electrical pulse and does not fully decay until after the decay of the electrical pulse. Typically, the electrical wave form is developed in the secondary winding of a pulse transformer 42 which has its primary winding coupled to a weld power supply 44 through a suitable weld power switch 46. The weld power supply 44 typically includes a bank of capacitors and a charging circuit which are effective to produce an instantaneous source of electrical energy to the pulse weld transformer 42, as will be explained in greater detail hereinafter.

The force mechanism 40 is coupled to a force mechanism power supply 48 through a force power switch 50.

The weld power switch 46 and the force power switch 50 are controlled in timed relation to one another by a process control unit 52 which is effective to energize the respective power switches 46 and 50 in such a fashion that, typically, the force power switch 50 is energized to commence the application of the force pulse on the platen 26 and the block 10, and the disc 14. Then, the control unit 52 is effective to energize the weld power switch 46 to allow the capacitors of the weld power supply 44 to discharge and produce an electrical energy pulse in the primary winding of the pulse weld transformer 42. The secondary winding of the pulse weld transformer 42 causes a high electrical energy pulse between the electrodes 18 and 34, and the disc 14 and the block 10. An electrical energy pulse having a current density of the order of from 500,000 to 3,000,000 amperes per square inch at the faying interface between the disc 14 and the block 10 has been satisfactory in achieving the desired results of the invention of obtaining the desired solid state resistance weld. In operation of the illustrated embodiment, the force pulse peaks in the order of from 0.5 to 2.0 milliseconds after the electrical energy pulse peaks.

It will be appreciated that the outer electrode 34 is effective, in operation, to apply a contacting pressure on the block 10 to insure proper electrical contact, while the center electrode 18 is effective to produce the desired bonding pressure to effect the desired force between the disc 14 and the block 10 during the welding procedure.

It has been theorized that the phenomenon involved in the welding process of the invention involves a conversion of electrical energy at the interface of the disc 14 and the block 10 in a magnitude sufficient to cause the establishment of atomic bonds across the interface, resulting in a solid-state pulse resistance weld. The electrical energy pulse applied to the pulse weld transformer 42 follows an electrical path through the platen 26, the center electrode element 18, which is in electrical contact therewith, the marginal edge regions of the disc 14, the region of the block 10 adjacent the exterior surface of the aperture 12, and the electrode element 34.

It will be noted that the inside diameter of the land 23 of the center electrode 18 is larger than the diameter of the hole 12 which will effectively cause the electrical path, from the center electrode 18 to the outer electrode 34, to be outwardly of the marginal edge of the hole 12, thereby effecting the weld at a distance spaced outwardly of the marginal edge. The formation of the weld in such a location relative to the hole 12 will militate against any expulsion of metal or oxides thereof entering the hole 12. In the event of the creation of such expulsion during the welding procedure, it will tend to remain in the zone between the mating surfaces of the disc 14 and the adjacent surface of the engine block 10 on opposing sides of the weld.

In order to further concentrate and define the weld area of the cover 14 and the block 10, certain modified forms of the invention are illustrated in FIGS. 5 and 6. Similar reference numerals are employed for similar parts with prime designations to distinguish the respective modifications.

FIG. 5 shows a modification of the structure illustrated in FIGS. 2, 3, and 4, wherein the disc 14' to be welded to the block 10' to cover the hole 12' is substantially identical with the disc 14' of the first described embodiment. However, the block 10' has an outwardly projecting annulus 16' around the outer surface of the hole 12' which effectively contacts the facing surface of the cover 14'. The weld is formed at the faying interface between the cover 14' and the block 10' with the same equipment as illustrated in FIG. 2. The modified form of the invention illustrated in FIG. 5 will enable the current density at the faying interface to be concentrated in comparison with the structure illustrated in the previously described embodiment.

Another modified form of the invention is illustrated in FIG. 6, wherein the cover 14" is covered to produce an annular circumferential groove 16' of sufficient diameter to completely encircle the outer surface of the hole 12" in the block 10". Similarly, with respect to the modified form of the invention illustrated in FIG. 5, the arrangement of FIG. 6 tends to concentrate the current density at the faying interface between the cover 14" and the block 10" and, therefore, more definitively define the weld shape.

The above described invention is directed to a method for welding thin walled sheet members to massive bodies. While there is no particular upper limit to the thickness of the thin walled sheet material, it is considered that the typical thickness employed for the illustrated embodiments would be of the order of 0.060 inch.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

I CLAIM:

1. A method of welding an electrically conductive seal to the exposed surface of a massive cast part having at least one hole therein, comprising:
   constraining the massive cast part against movement;
   disposing the electrically conductive seal in overlying relationship to the hold in said massive cast part;
   imposing a peaked force pulse to the faying interface between said seal and said part to urge the same into intimate contact;
   applying a peaked electrical energy pulse to said seal and said part of a current density within the range of from 500,000 to 3,000,000 amperes per square inch of the faying interface between said seal and said part; and
   programming the peak of said electrical pulse and the peak of said force pulse to be displaced from each other in time by an interval of from 0.5 to 2.0 milliseconds to bond said seal to said part to form an integral bonded article.

2. The method defined in claim 1 wherein said electrical energy pulse is applied as a single pulse.

3. The method defined in claim 2 wherein said electrical energy pulse is of a duration of from 0.5 to 5.5 milliseconds.

4. The method defined in claim 1 wherein the force pulse applied to said seal and said part reaches its peak amplitude before the electrical energy pulse arrives at its peak amplitude.

5. The method defined in claim 1 wherein said seal is formed of thin walled sheet material.

6. The method defined in claim 5 wherein the sheet material is of the order of 0.060 inch in thickness.

7. The method defined in claim 1 wherein the force pulse and the electrical energy pulse are applied by means of concentric electrodes, the center electrode applying the force pulse and the center and outer electrodes cooperatively applying the electrical energy pulse.

* * * * *